Figure 1:
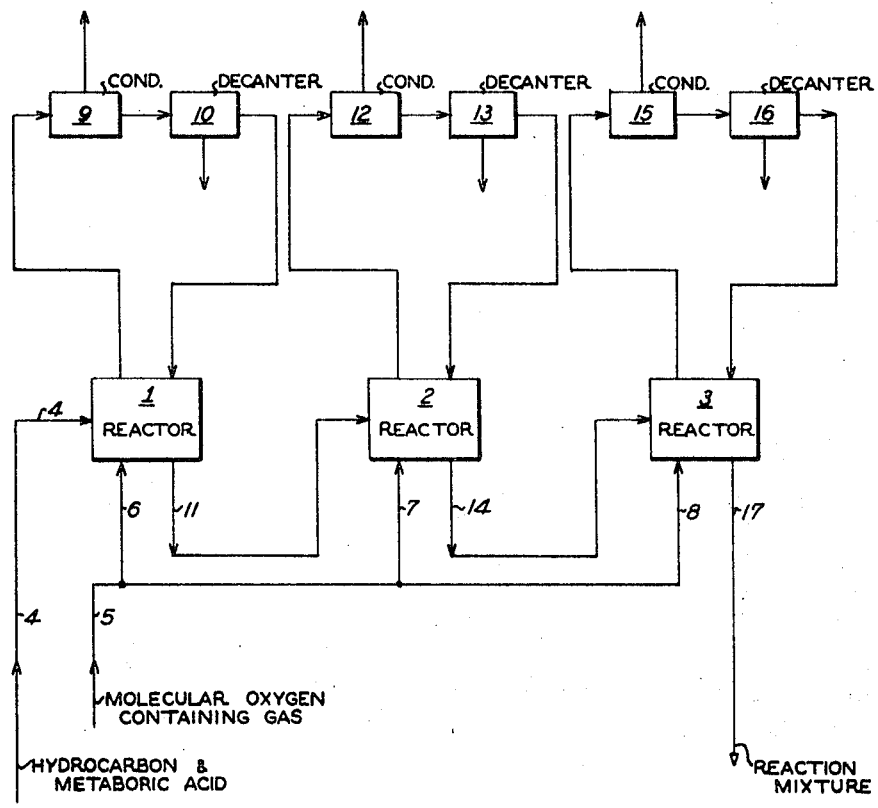

Aug. 5, 1969  J. L. RUSSELL  3,459,805
HYDROCARBON OXIDATION PROCESS

Filed May 12, 1966  2 Sheets-Sheet 1

INVENTOR
JOSEPH L. RUSSELL
BY
William C. Long
ATTORNEY

United States Patent Office 3,459,805
Patented Aug. 5, 1969

3,459,805
HYDROCARBON OXIDATION PROCESS
Joseph L. Russell, Ridgewood, N.J., assignor to Halcon International, Inc., a corporation of Delaware
Continuation-in-part of application Ser. No. 392,263, Aug. 26, 1964. This application May 12, 1966, Ser. No. 549,607
Int. Cl. C07c *45/00, 29/00*
U.S. Cl. 260—586  5 Claims This is a continuation-in-part of my application Ser. No. 392,263 filed Aug. 26, 1964 now abandoned.

The present invention relates to an improved process for the continuous oxidation of saturated hydrocarbons. Particularly, the invention relates to an improved method whereby a saturated hydrocarbon such as cyclohexane is subjected to molecular oxygen oxidation continuously in a plurality of oxidation steps, the oxidation being carried out in the presence of a boron adjuvant.

The molecular oxygen oxidation of hydrocarbons such as cyclohexane is an important commercial subject. Methods have previously been known for carrying out this reaction both in continuous and batch-type fashion in order to produce a reaction mixture containing important chemicals such as cyclohexanol and cyclohexanone. In high volume commercial installations, it is desirable for reasons of process economy and product quality that the process be carried out in a continuous fashion.

In prior oxidation techniques, the continuous processes have been conducted such that the initial reaction stage oxidation is carried out at conditions of maximum reaction product dilution. It was by diluting the product in the initial reaction stage that the highest selectivity of the reaction for example to cyclohexanol and cyclohexanone was achieved. U.S. Patent 2,557,281 provides a description of such operation.

Recently, important advances have been made in the oxidation of saturated hydrocarbons with molecular oxygen. These important advances involve the provision of a reaction adjuvant such as metaboric acid during the molecular oxygen oxidation. The provision of this adjuvant has markedly improved the reaction selectivity to the corresponding alcohol.

It was, of course, desirable to apply the continuous processing technology to this improved oxidation using the boron adjuvant. However, because of inherent differences in the processes, it was found that by directly applying prior continuous process techniques involving high dilution of the reaction products, as by recycling all condensed hydrocarbon to the first stage, to systems employing the boron adjuvant the full potential of the use of the boron adjuvant was not achieved. Reaction selectivities in the continuous system were significantly below those which were thought to be obtainable.

It is an object of this invention to provide an improved continuous process for the oxidation of saturated hydrocarbons.

It is a further object of the present invention to provide an improved process for the continuous oxidation of cyclohexane in a plurality of oxidation steps and in the presence of a boron adjuvant.

Figure 2:
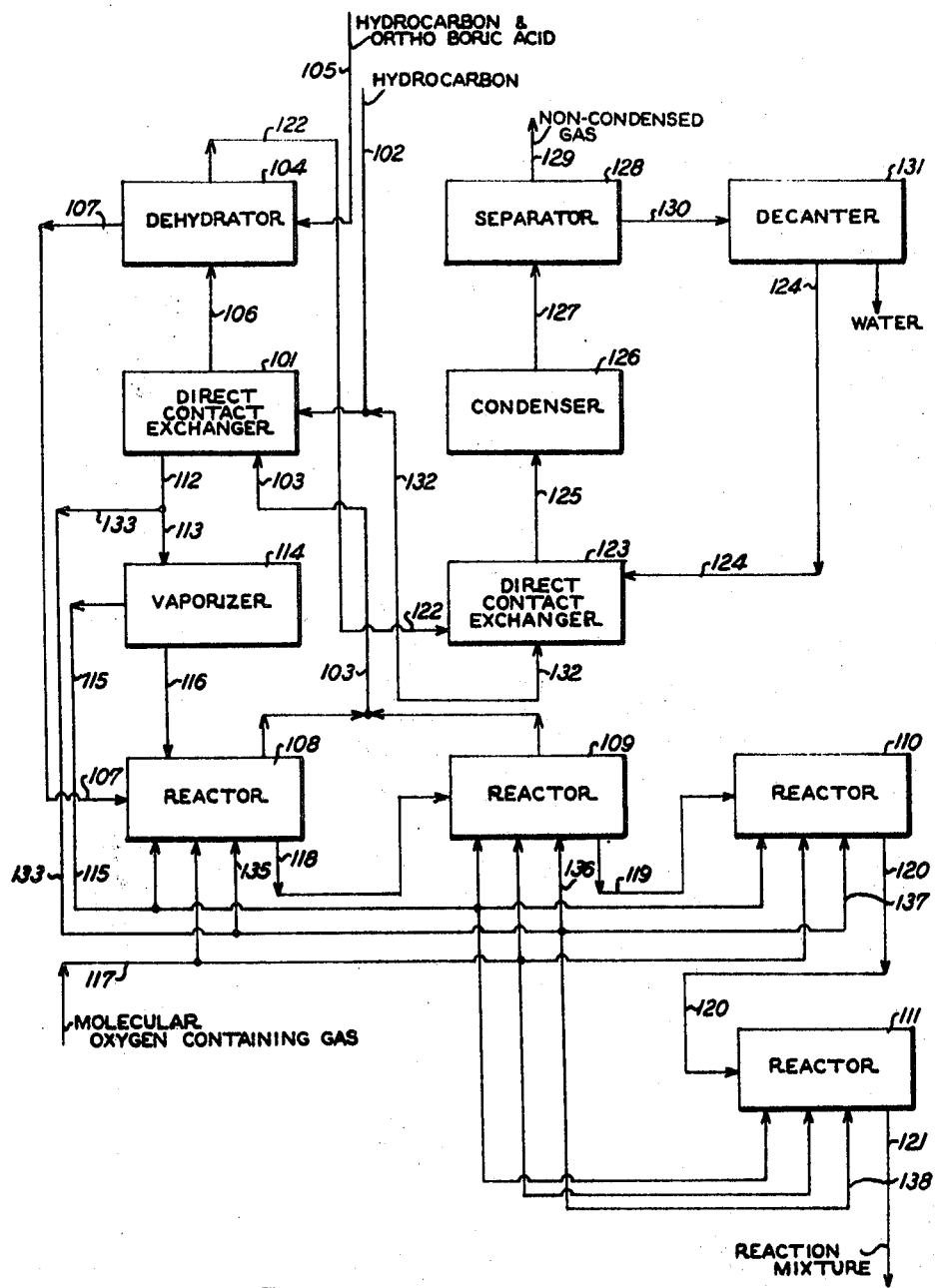

Other objects of the invention will be apparent from the following description:

The accompanying FIGURES 1 and 2 illustrate in diagram form embodiments of the present invention.

In accordance with the present invention, it has been discovered that for maximum selectivity to the corresponding alcohol plus ketone, it is necessary in a continuous multi-stage hydrocarbon oxidation using a boron adjuvant that most of the oxygen which is reacted be reacted with hydrocarbon which contains a relatively high concentration of reaction products. Specifically, in the present invention, the oxidation is carried out such that at least the percentage, A, of the total oxygen reacted with hydrocarbon which contains at least 1.5 mols of oxidized hydrocarbon per 100 mols of unreacted hydrocarbon plus oxidized hydrocarbon, where $$A = \frac{x-1.5}{x}(100)$$

and $x$ is the total percentage of hydrocarbon which is is reacted in the system. Suitably, in a continuous multistage cyclohexane oxidation, wherein a boron adjuvant is employed, the reaction product concentration level in the first reaction stage is maintained at a level of at least 1.5 mol percent hydrocarbon oxidation products and preferably at least 2.0 percent based on hydrocarbon plus hydrocarbon oxidized. In this way, the total oxygen reacted is reacted while in contact with hydrocarbon having at least the concentration of 1.5% oxidation products and more preferably at least 2% products as above indicated.

FIGURE 1 illustrates an appropriate practice of the invention. Referring to this figure, there are provided in a continuous oxidation system three separate oxidation reactors numbered respectively, reactors 1, 2, and 3. Each of the reactors is equipped with a condenser and a decanter enabling the condensation of vapors which are withdrawn from each reactor, a decantation of the condensed vapors, and return of separated hydrocarbon to the reaction zone.

In the continuous oxidation, a slurry of hydrocarbon and finely divided solid boron adjuvant, preferably metaboric acid, is fed to reactor 1 through line 4. Molecular oxygen containing gas is fed to the system through line 5 to each individual reactor through lines 6, 7, and 8. Vapors removed from reactor 1 are condensed in condenser 9 and decanted in vessel 10. The lower water layer is discarded and the upper hydrocarbon phase is returned to reactor 1. The reaction in each of the reactors is preferably carried out at a temperature in the range of about 100–300° C., preferably 140 to 180° C. and at elevated pressure such as 10–500 p.s.i.g. sufficient to maintain liquid phase in the reactor while still permitting hydrocarbon boil-up and removal of hydrocarbon and water vapors. Heat is provided as needed to insure hydrocarbon boil-up and low system water vapor partial pressure.

As the critical aspect of the present invention, the system operation is regulated such that the mixture in reactor 1 contains at least 1.5 mol percent of oxidation products based on reacted hydrocarbon. The conversion in the first reactor is adjusted by standard engineering practices including regulation of the amount of molecular oxygen fed to this reactor and/or residence time and the like. Importantly, the condensed hydrocarbon from the reactors is not all returned to the first reactor as is desirable in prior art processes. Only such condensed hydrocarbon is returned to the first reactor as was removed therefrom.

A portion of the reaction mixture from reactor 2 is continuously withdrawn and led through line 11 to reactor 2. In this reactor, the oxidation is continued with vapors being removed, condensed in condenser 12, separated in decanter 13, with hydrocarbon being returned to the reactor 2.

A portion of the reaction mixture from reactor 2 is continuously removed and passed to reactor 3 wherein additional hydrocarbon oxidation occurs as will be apparent to those skilled in the art. Condenser 15 and decanter 16 are employed in conjunction with reactor 3. The final reaction mixture is removed from reactor 3 by means of line 16. This reaction mixture comprises mainly borate esters of the alkanol formed by the hydrocarbon oxidation in unreacted hydrocarbon. This mixture may be worked up by conventional methods such as hydrolysis to recover the valuable components of the mixture.

It will be apparent that whereas a three reactor system is described in the above embodiment that a greater or lesser number of reactors can be employed. It is essential in accordance with the present invention that more than $$\frac{x-1.5}{x}(100)$$

percent of the oxygen absorbed in the continuous operation be absorbed at oxidate molar concentration equal to or higher than 1.5% hydrocarbon conversion, where $x$ is the overall hydrocarbon conversion in the oxidation reactors.

FIGURE 2 illustrated another embodiment of the invention which employs 4 reactors in series and also provides for a common condensation system for the vapors from other reactors.

The hydrocarbon is continuously oxidized using molecular oxygen in a 4 reactor train. Referring to FIGURE 2, net fresh hydrocarbon is introduced into direct contact exchanger 101 by means of line 102. In the direct contact exchanger, the hydrocarbon is heated by contact with oxidation reaction vapors which pass to the exchanger by means of line 103.

A slurry of hydrocarbon and ortho boric acid is introduced into dehydrator 104 by means of line 105. In the dehydrator, the slurry is dehydrated by contact with vapors which pass to the dehydrator exchanger 104 by means of line 106. The dehydrated slurry of hydrocarbon and metaboric acid passes from dehydrator 104 by means of line 107 to the first of the series of oxidation reactors, reactor 108.

Preheated hydrocarbon is removed from exchanger 101 by means of line 112. The stream is divided with a portion passing by means of line 113 to vaporizer 114. In the vaporizer the hydrocarbon is partially vaporized and the hydrocarbon vapors pass via line 115 to each of the 4 reactors 108, 109, 110, and 111 as needed in order to provide the necessary heat to maintain reaction temperature. Liquid hydrocarbon from vaporizer 114 is removed by means of line 116.

In the oxidation reactors, the hydrocarbon is oxidized by molecular oxygen which is introduced to the reactors by means of line 117. Essential to practice of the present invention is the maintenance of the concentration of oxidized materials in the reactors such that at least A percent of the oxygen reacting where $$A = \frac{x-1.5}{x}(100)$$

$x$ being hydrocarbon conversion, is reacted in a zone having a molar concentration of at least 1.5% of oxidized products. Reaction mixture from reactor 108 is continuously removed by means of line 118 and passed to reactor 109. Likewise, reaction mixture from reaction 109 passes by means of line 119 to reactor 110, from reactor 110 via line 120 to reactor 111, with the final reaction mixture being removed by means of line 121 and worked up in accordance with known procedures for the recovery of oxidation products and the recycle of unreacted hydrocarbon. For simplicity, these latter steps are not shown in the drawing.

During the continuous operation, vapors comprising hydrocarbon, nitrogen, and water, are removed from each of the oxidation reactors, combined, and passed via line 103 to exchanger 101. From exchanger 101 the vapors pass via line 106 to dehydrator 104 and thence via line 122 to direct contact exchanger 123. In this exchange 123 the vapors preheat recycle hydrocarbon which enters the exchanger via line 124. Vapors from exchanger 123 pass by means of line 125 to condenser 126 wherein the vapors are cooled to a temperature low enough to condense substantially all the water and hydrocarbon contained therein. The condensed mixture passes by means of line 127 to separator 128, and non-condensed gases are removed by means of line 129. A portion of these gases is desirably employed to dilute air and form the oxygen containing oxidizing gas. Liquid passes from separator 128 by means of line 130 to decanter 131. A lower aqueous phase is separated via line 132 and discarded. The organic phase mainly comprised of hydrocarbon passes by means of line 124 to exchanger 123. The preheated hydrocarbon from exchanger 123 passes via line 132 to exchanger 101. The heated hydrocarbon from exchanger 101 not passed to vaporizer 114 passes via lines 112 and 133 back to the fractionation zones.

As an essential to practice of this embodiment of the invention, a substantial amount of the thus returning hydrocarbon by-passes the first reactor 108 and passes directly to one or more of the reactors 109, 110 and 111. By this by-passing procedure, relatively high concentration of oxidation product can be maintained in the first reactor 109 so as to satisfy the prescribed requirements of this invention as to percent oxygen reacted in reaction mixture having at least 1.5% oxidation products. In accordance with this embodiment, the return hydrocarbon passing through line 133 is distributed through lines 135, 136, 137, 138 to provide the desired conditions of reaction product concentration in each reactor.

The overall hydrocarbon conversion in the continuous system is preferably 4 to about 25% and most desirably about 6 to 15%.

The boron adjuvant is solid material dispersed in finely divided form in the hydrocarbon charge to the reaction. Metaboric acid is the preferred adjuvant. Other materials which can be employed include orthoboric acid (which dehydrates under the reactor conditions), tetraboric acid, pyroboric acid, boron oxide, and mixtures thereof. These adjuvants are employed in amounts of the order of about .5 to 10% weight of the cyclohexane and usually 1 to 5% thereof.

As a result of the specified operation in the first stage of the continuous reaction employing a plurality of separate reaction steps, the selectivity of the reaction is very significantly improved. For example, for the same reaction system employing the same overall conversion of hydrocarbon, where the operation is as specified in this invention, the selectivity to a mixture of alcohol and ketone ranges from 5 to 15% higher than for processes which are patterned after prior art continuous systems and which provided for a relatively high reaction product dilution in the first step.

The invention is applicable to the oxidation of saturated hydrocarbons generally, and especially to cycloalkanes such as cyclopentane, cyclohexane, cycloheptane, cyclooctane, cyclododecane, and the alkyl derivatives thereof although the invention is also applicable to straight and branched chain paraffins and to substituted derivatives. Generally saturated hydrocarbons having 4 to 20 carbon atoms are advantageously treated according to the invention.

Air or air diluted with nitrogen or other inert gas is the preferred source of molecular oxygen oxidant.

The oxidized hydrocarbon, which must be present in at least a molar concentration of 1.5 mols per 100 mols of hydrocarbon plus oxidized hydrocarbon for the reaction of at least the percentage A of oxygen reacted as above described, is mainly in the form of borate or perborate esters of the alcohol or other oxidation products.

The following examples will serve to illustrate the invention.

EXAMPLE 1

In this example, the apparatus described in the accompanying drawing is employed. In each of the 3 reactors, the reaction mixture temperature is maintained at 165° C. The pressure in each reaction zone is about 120 p.s.i.g. The oxidizing gas charge through line 5 to the system contains about 5% oxygen by volume and the remainder nitrogen.

Cyclohexane containing about 5% by weight finely divided metaboric acid dispersed therein is continuously charged through line 4 to reactor 1. In reactor 1 the mixture is contacted with the oxidizing gas which is introduced through line 1. The rate of introduction of oxygen is controlled to provide for substantially complete reaction of the introduced molecular oxygen. Sufficient molecular oxygen is introduced into reactor 1 through line 6 to react about 3.0% of the cyclohexane to produce cyclohexanol and cyclohexanone.

Vapors mainly comprised of nitrogen, water, cyclohexane, and some carbon dioxide are removed, cooled in condenser 9 to condense water and cyclohexane, the uncondensed gases are at least in part recycled, and the condensed materials are separated in decanter 10. The water is removed and the condensed cyclohexane is recycled to the reactor. Thus the molar concentration of hydrocarbon oxidation products is maintained at about 3%.

The reaction mixture from reactor 1 is continuously removed at a rate sufficient to maintain stable net volume in reactor 1 and is passed to reactor 2. Sufficient oxidizing gas is introduced into reactor 2 to react with an additional 3% of the cyclohexane therein.

The reaction mixture from reactor 2 is continuously removed by means of line 14 and further reacted in reactor 3. An additional 3% cyclohexane conversion is carried out in reactor 3 thus giving an overall conversion of 9%.

The reactor effluent from reactor 3 is hydrolyzed with water and the produced cyclohexanol and cyclohexanone recovered in accordance with known techniques. The composition of the recovered oxidation reaction mixture is as follows: 80% cyclohexanol, 8% cyclohexanone and 12% other oxidation products.

By way of contrast, in a reaction similar to the one above described but not according to the invention wherein all cyclohexane condensate from the three reactors is recycled to reactor 1, the hydrocarbon oxidation product concentration in reactor 1 is about 1 mol percent and the composition of the reaction product mixture is as follows: 77% cyclohexanol, 5% cyclohexanone and 18% and other oxidation products.

In the case above, if just enough of the cyclohexane condensate is returned to reactor 1 so as to maintain a hydrocarbon oxidation product concentration of about 2%, leaving reactor 1, then the final product mixture contains: 80% cyclohexanol, 7% cyclohexanone, 13% other oxidation products.

From the above results, it can be clearly seen that the process of the present invention represents a real and important advance in hydrocarbon oxidation.

EXAMPLE 2

Cyclohexane is continuously oxidized using molecular oxygen in a 4 reactor train. Referring to FIGURE 2, net fresh cyclohexane is introduced into direct contact exchanger 101 by means of line 102. In the direct contact exchanger, the hydrocarbon is heated to 163° C. by contact with oxidation reaction vapors which pass to the exchanger by means of line 103.

A slurry of cyclohexane and ortho boric acid containing 22% by weight ortho boric acid is introduced into dehydrator 104 by means of line 105. In the dehydrator, the slurry is dehydrated at 149° C. by contact with vapors which pass to the dehydrator exchanger 101 by means of line 106. The dehydrated slurry of cyclohexane and metaboric acid passes from dehydrator 104 by means of line 107 to the first of the series of oxidation reactors, reactor 108.

Preheated cyclohexane is removed from exchanger 101 by means of line 112. The stream is divided with a portion passing by means of line 113 to vaporizer 114. In the vaporizer the cyclohexane is partially vaporized and the cyclohexane vapors pass via line 115 to each of the 4 reactors 108, 109, 110 and 111 as needed in order to provide the necessary heat to maintain the reaction temperature of 165° C. Liquid cyclohexane at 190° C. from vaporizer 114 is removed by means of line 116.

In the oxidation reactors, the cyclohexane is oxidized by molecular oxygen which is introduced to the reactors by means of line 117. The oxidizing gas comprises by volume 10% oxygen and the oxidation conditions are a temperature of 165° C. and a pressure of 140 p.s.i.a. in each reactor. The oxidizing gas is fed at a rate whereby substantially all the oxygen reacts. The cyclohexane conversion per pass is 9%, that is the effluent leaving reactor 111 via line 121 contains 9 mols of oxidized cyclohexane per 100 mols of unreacted cyclohexane plus oxidized cyclohexane.

In accordance with the invention, it is essential that the oxidation be carried out such that at least A% of the oxygen reacted reacts with liquid cyclohexane containing at least 1.5% oxidized products. Since $$A = \frac{x - 1.5}{x}(100)$$

and $x$ is 9% it is essential that at least $$\frac{9 - 1.5}{9}(100)$$

or 83.3% of the oxygen react in such an environment.

Per 100 moles of cyclohexane reacting, about 25 mols react in reactor 108, 25 mols in reactor 109, 25 mols in reactor 110, and 25 mols in reactor 111. The relative amount of oxidizing gas fed to each zone is adjusted to provide for this conversion in each zone.

In zone 108, about 31 mols per hour of liquid cyclohexane is fed via line 107, 0 mols per hour via line 135, and 98 mols per hour via line 116. Vapors from zone 108 contain per hour 6 mols of cyclohexane in addition to the amount of cyclohexane introduced as vapor via line 115 to provide heat. Liquid effluent from zone 108 is removed at the rate of 123 mols per hour and passes to reactor 109 via line 118. The effluent contains 1.8 mol percent oxidized cyclohexane.

Liquid cyclohexane in amount of 64 mols per hour is introduced into reactor 109 via line 136. Vapors from zone 109 contain per hour 29 mols cyclohexane in addition to the cyclohexane vapor introduced via line 115 to provide heat. Liquid effluent from zone 109 is removed at the rate of 158 mols per hour and passes via line 119 to reactor 110. This effluent contains 2.9 mol percent oxidized cyclohexane.

Liquid cyclohexane in amount of 0 mols per hour is introduced into reactor 110 via line 137. Vapors from zone 110 contain per hour 29 mols cyclohexane in addition to the cyclohexane vapor introduced via line 115 to provide heat. Liquid effluent from zone 110 is removed at the rate of 129 mols per hour and passes via line 120 to reactor 111. This effluent contains 5.2 mol percent oxidized cyclohexane.

Liquid cyclohexane in amount of 0 mols per hour is introduced into reactor 111 via line 138. Vapors from zone 111 contain 29 mols per hour cyclohexane in addtion to the cyclohexane vapor introduced via line 15 to provide heat. Liquid effluent from zone 111 is removed at the rate of 100 mols per hour via line 121. This effluent contains 9 mol percent oxidized cyclohexane.

The effluent is hydrolyzed to convert borate ester to cyclohexanol and an oxidation product mixture is obtained which contains, on an Ane free basis, 80% cyclohexanol and 8% cyclohexanone, these products are recovered by known techniques.

During the continuous operation, vapors comprising cyclohexane, nitrogen, and water, are removed from each of the oxidation reactors combined and passed via line 103 to exchanger 101 wherein the vapors are cooled of the oxidation reactors combined and passed via line 106 to dehydrator 104 and thence via line 122 to direct contact exchanger 123. In this exchanger 123 the vapors preheat recycle cyclohexane which enters the exchanger via line 124. Vapors from exchanger 123 pass by means of line 125 to condenser 126 wherein the vapors are cooled to 30° C. to condense substantially all the water and cyclohexane contained therein. The condensed mixture passes by means of lines 127 to separator 128, and non-condensed gases are removed by means of line 129. Liquid passes from separator 128 by means of line 130 to decanter 131. A lower aqueous phase is separated via line 132 and discarded. The organic phase mainly comprised of cyclohexane passes by means of line 124 to exchanger 123. The preheated hydrocarbon from exchanger 123 passes via line 132 to exchanger 101. Liquid from exchanger 101 passes as above described.

What is claimed is:

1. In a continuous process for the partial oxidation of a saturated hydrocarbon having 4 to 20 carbon atoms in the liquid phase with molecular oxygen at a temperature in the range 100 to 300° C. in a series of separate oxidation stages with the reaction mixture from a stage passing to the next in the series of stages and the reaction mixture from the last stage passing to product recovery, the improvement which comprises carrying out the oxidation in the presence of a boron adjuvant selected from the group of orthoboric acid, metaboric, tetraboric acid, pyroboric acid and boron oxide and reacting at least A percent of the total oxygen reacted in said stages with liquid saturated hydrocarbon having 4 to 20 carbon atoms containing a molar concentration of oxidized saturated hydrocarbons having 4 to 20 carbon atoms of at least 1.5% wherein $$A = \frac{x-1.5}{x}(100)$$

and $x$ is the percent total hydrocarbon conversion in said process.

2. In a continuous process for the partial oxidation of cyclohexane in the liquid phase with molecular oxygen at a temperature in the range 100 to 300° C. in a series of separate oxidation stages with the reaction mixture from a stage passing to the next in the series of stages and the reaction mixture from the last stage passing to product recovery, the improvement which comprises carrying out the oxidation in the presence of a boron adjuvant selected from the group of orthoboric acid, metaboric acid, tetraboric acid, pyroboric acid and boron oxide and reacting at least A percent of the total oxygen reacted in said stages with liquid cyclohexane containing a molar concentration of oxidized cyclohexane of at least 1.5% wherein $$A = \frac{x-1.5}{x}(100)$$

and $x$ is the percent total cyclohexane conversion in said process.

3. The process of claim 2 wherein said boron adjuvant is metaboric acid.

4. The method of claim 2 wherein said process is carried out in three separate oxidation stages.

5. In the process for the partial oxidation of a saturated hydrocarbon having 4 to 20 carbon atoms with molecular oxygen in a series of separate oxidation zones wherein the said hydrocarbon in the liquid phase is contacted with molecular oxygen at a temperature in the range of 100 to 300° C. and in the presence of a boron adjuvant selected from the group of orthoboric acid, metaboric acid, tetraboric acid, pyroboric acid and boron oxide, and wherein the reaction mixture from a zone passes to the next in the series of zones and the reaction mixture from the last zone passes to product recovery, the improvement which comprises carrying out the reaction in the first of a series of oxidation zones in a liquid part of reaction mixture which contains at least 1.5 mol percent of oxidized saturated hydrocarbon having 4 to 20 carbon atoms mainly in the form of alcohol borate ester.

References Cited

UNITED STATES PATENTS

| | | |
|---|---|---|
| 1,947,989 | 2/1934 | Hellthaler. |
| 2,557,281 | 6/1951 | Hamblet et al. |
| 2,232,704 | 2/1966 | Helbig et al. |
| 3,243,449 | 3/1966 | Winnick. |

FOREIGN PATENTS

| | | |
|---|---|---|
| 1,327,403 | 4/1963 | France. |
| 626,256 | 6/1963 | Belgium. |

LEON ZITVER, Primary Examiner

MATTHEW M. JACOB, Assistant Examiner

U.S. Cl. X.R.

260—597, 617, 631, 632